United States Patent
Thompson

(10) Patent No.: US 6,650,831 B1
(45) Date of Patent: Nov. 18, 2003

(54) METHOD OF PROVIDING ACCESS TO PHOTOGRAPHIC IMAGES OVER A COMPUTER NETWORK

(76) Inventor: James Thompson, 642 Washington St., Hoboken, NJ (US) 07030

( * ) Notice: Subject to any disclaimer, the term of this patent is extended or adjusted under 35 U.S.C. 154(b) by 0 days.

(21) Appl. No.: 09/688,303

(22) Filed: Oct. 13, 2000

Related U.S. Application Data

(60) Provisional application No. 60/159,681, filed on Oct. 15, 1999.

(51) Int. Cl.[7] .................. G03B 17/02; G03B 17/24; G03B 19/00; G03B 29/00; G06F 17/60
(52) U.S. Cl. .................. 396/6; 396/311; 396/429; 705/1
(58) Field of Search .................. 396/429, 6, 207, 396/208, 211, 311; 355/40, 77; 705/1, 27

(56) References Cited

U.S. PATENT DOCUMENTS

| | | | | |
|---|---|---|---|---|
| 5,963,915 A | * | 10/1999 | Kirsch | 705/26 |
| 5,986,651 A | * | 11/1999 | Reber et al. | 345/335 |
| 6,133,985 A | * | 10/2000 | Garfinkle et al. | 355/40 |
| 6,173,119 B1 | * | 1/2001 | Manico et al. | 396/6 |
| 6,181,326 B1 | * | 1/2001 | Takahashi | 345/158 |
| 6,199,048 B1 | * | 3/2001 | Hudetz et al. | 705/23 |
| 6,275,656 B1 | * | 8/2001 | Cipolla et al. | 396/6 |
| 6,283,646 B1 | * | 9/2001 | Dellert et al. | 355/40 |
| 6,322,260 B1 | * | 11/2001 | Manico et al. | 396/599 |
| 6,412,699 B1 | * | 7/2002 | Russell et al. | 235/472.01 |

* cited by examiner

Primary Examiner—Christopher Mahoney
(74) Attorney, Agent, or Firm—Schweitzer Cornman Gross & Bondell LLP

(57) ABSTRACT

A method of providing access to photographic images over a computer network wherein a photographic image hosting service provider predetermines network access information for a set of photographic images, including a network address, the network access information is conveyed to a user without receiving identifying information from said user, the user captures a set of photographic images and conveys the network access information to an intended viewer of the photographic images, the user transmits the images to the service provider along with information associating the images with the network access information, which service provider posts the photographic images on a server connected to the network, wherein the photographic images are accessible over the network at the network address of the network access information.

12 Claims, 12 Drawing Sheets

METHOD OF PROVIDING ACCESS TO PHOTOGRAPHIC IMAGES OVER A COMPUTER NETWORK

RELATED APPLICATIONS

This application claims the benefit of U.S. Provisional Application Serial No. 60/159,681, filed Oct. 15, 1999, pending.

FIELD OF THE INVENTION

The invention pertains to the field of providing access to photographic images over a computer network, such as the Internet global computer network.

BACKGROUND OF THE INVENTION

A number of systems have been implemented for sharing or distributing digital copies of photographic images over a global computer network, such as the Internet. For example Fuji and Kodak have established basic services that allow customers to store and access digitized copies of their photographs over the Internet. Also, photographic development services such as Mystic Color Labs and Seattle Film Works provide their customers with an option for digitizing and posting photographic images on the Internet. In addition, Internet sites such as Photoloft.com, photoclub.com and photoisland.com will post images on the Internet if a user first registers as a member. These services were created to address customers needs for storing, accessing and sharing photographic images in a more convenient manner. The Internet provides such convenience because it allows remote access to a variety of types of information, including photographic images, by anyone with access to the Internet, knowledge of the location of the information (i.e., the Internet address), and authorization (e.g., a password).

The methods for sharing and distributing photographic images over the Internet offered by the organizations identified above provide some conveniences. However with some of these prior methods, the photographer must wait until after the photographic images have been made available over (i.e., []posted on[]) the Internet to learn the network location (address) and passwords for the images. If the photographer must wait until the images are posted on the network to receive the Internet address where the images will be located, then only parties to whom the photographer is able to communicate with at that time will be able to find and view the images. Often it is difficult and time consuming to communicate such information at a later date. The inconvenience of communicating this information is a barrier to sharing images on the Internet.

Other prior methods, such as the Event Photo feature of ClubPhoto.com, can provide the photographer with the (prospective) network location for the photographs, along with any necessary passwords, before the pictures are taken. This allows the photographer to communicate the network location of the pictures to the intended recipients (e.g., the subjects of the photographs). However, this prior method (and others like it) requires that the photographer first register and establish an account with an image hosting service. Upon establishing the account, the photographer is provided with the prospective network location for the photographs, and a password. Thus, with this method, the photographer must plan ahead in sufficient time to contact the service provider, and must have the appropriate means, such as access to the Internet, to contact the service provider and register an account. As can be appreciated, at many times, the step of contacting the service provider and registering an account can be inconvenient or impossible.

Therefore, what is desired is a method to share or distribute photographic images over a global computer network, such as the Internet, where the photographer does not have to wait until the photographic images are available over the network and does not have to first establish an account with an image hosting service to communicate the prospective network address of the location of the photographic images to intended recipients of the images.

SUMMARY OF THE INVENTION

The present invention is a process that will enable users to conveniently and efficiently provide access to photographic images over a global computer network, such as the Internet. The method eliminates the prior requirements of either having to wait until after photographic images are accessible over the Internet, or having to establish an account with an image hosting service to communicate the network access information of the images, such as the network address and password, to the intended recipients of the images.

In the method of the invention, a photographic image hosting service provider provides a plurality of sets of reserved, unique network access information for posting digital photographic images on a global computer network. The network access information is offered to users (e.g., photographers), optionally for a cost, at physical store locations or other distribution points that do not require registration with the photo hosting service. The network access information includes a global computer network address (e.g., a universal resource locator, or "URL"), and a password.

Upon receipt of the information, photographers can communicate the network access information to intended recipients of images (which may be the subjects of the photographs themselves) at the time the photographs are taken. The photographer then transmits the images to the image hosting service provider along with the network access information. Upon receipt of the images and the network access information, the image hosting service provider posts the images on the network at the reserved location for viewing by anyone with the network access information.

The network access information can be provided in the form of kits which include, for example, network access information cards to be distributed by the photographer at the time pictures are taken. If the media upon which the images are recorded must be physically transmitted to the hosting service, for processing, such as 35 mm film, then, upon submission by the photographer, one of such cards can be included inside the film processing envelope to associate the images recorded thereon with the reserved network access information.

Alternatively, the reserved network access information can be associated with or assigned to one or more photographic image storage media (such as 35 mm film, digital and other types) prior to or at the time of purchase or use by a consumer/photographer. The unique network access information is linked to a unique identifier of the storage media, such as a serial number, or other unique number. A compilation of such associated network access information and storage media identifier information is maintained, for example in a database, and is accessible to a provider of photographic image hosting services, which can be, for example, the manufacturer of the image storage media.

As above, when the photographer captures photographic images on such storage media, he (or she) can communicate the access information associated therewith to the intended recipient at, or contemporaneously with, the time the images are captured and recorded. The photographic image storage media is then transmitted to the photographic image hosting service provider, which matches the storage media with the unique network access information associated therewith, and stores the photographic images on a host computer connected to the global computer network, at a location accessible using the unique network access information.

The photographic image hosting service provider can determine the intended location for storing the photographic images merely by matching the unique identifier of the photographic image storage media with the associated network access information. Moreover, the unique identifier of the photographic storage media may be readily discernable from the storage media itself, for example by bar code reader, or the like, by the hosting service.

Additionally, knowledge of the location and time of sale of the photographic media allows for improved, targeted marketing and advertising, such as on the pages where the photographic images are viewed.

Thus, it can be appreciated that the method of the invention provides an improved manner in which to provide access to photographic images over a global computer network, such as the Internet. These and other aspects, objects, features and advantages will be more clearly understood and appreciated from a review of the following detailed description of the preferred embodiments and appended claims.

DETAILED DESCRIPTION OF THE INVENTION

Figure 1:
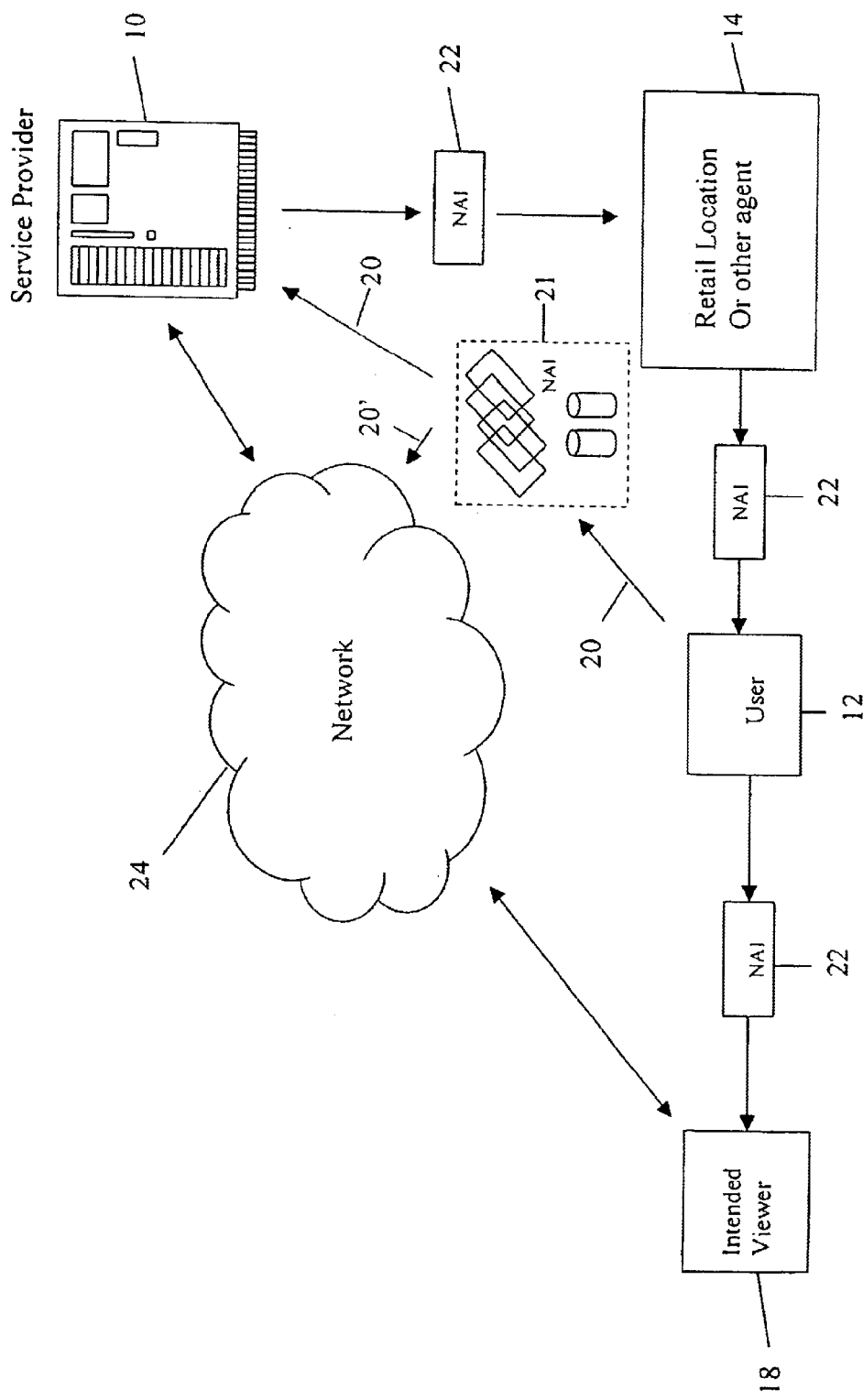
FIG. 1 is an overview of the system of the invention.
Figure 2:
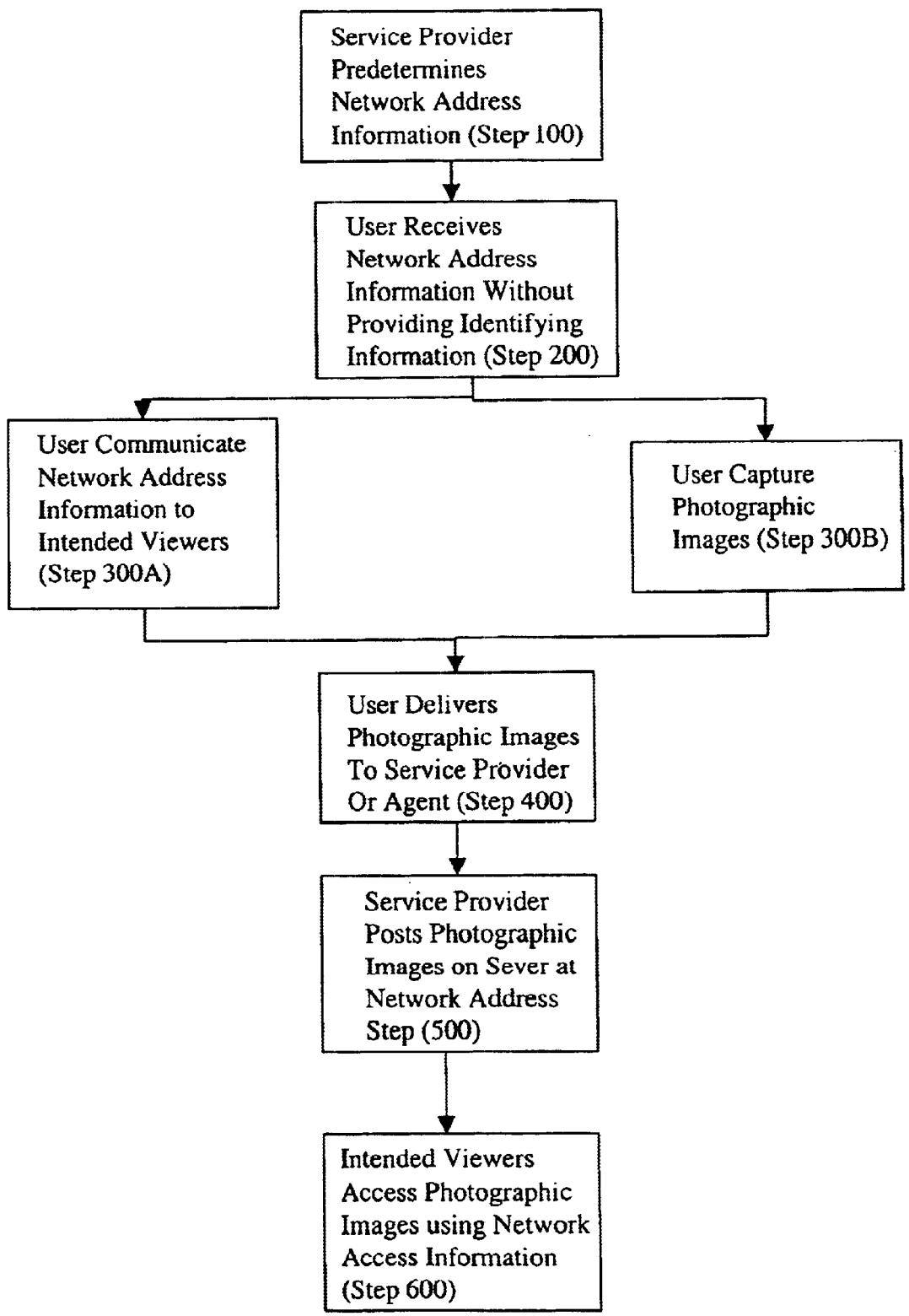
FIG. 2 is a flow diagram of the method of the invention.

Referring to FIGS. 1 and 2, in the method of the invention, a photographic image hosting service provider 10 predetermines a plurality of sets of unique reserved, unique network access information (NAI) 22 for accessing digital photographic images 21 over a computer network 24, such as the Internet global computer network (Step 100). The network access information 22 includes a computer network address (e.g., a universal resource locator, or "URL"), and a preferably one or more passwords. The unique network access information 22 also preferably includes at least one administrative password, which is intended to be held in confidence by the user 12. In addition, multiple user passwords can be included in the network access information to provide selective access to individual images.

It should be noted, that the term unique as used herein, for example as in "unique network access information", is intended to mean either absolutely novel, and not associated with any other information, or so uncommon as to be highly unlikely to be repeated.

The network access information 22 is offered to users 12 (e.g., photographers) at physical store locations 14 or via the network 24 (Step 200). The user 12 need not register with or otherwise provide identifying information to the service provider 10 prior to receiving the predetermined network access information 22. It is intended that, in many cases, all will be required of the user is to pay a fee for the service and/or photographic image storage media/camera. Therefore, the user 12 does not have to plan in advance to receive information 22.

After receipt of the network access information 22, photographer 12 communicates the network access information 22 to intended recipients 18 of images (which may be the subjects of the photographs themselves) (Step 300A) at or near the time the photographs are taken (Step 300B). The photographer 12 then transmits 20, 20' the images 21 to the image hosting service provider 10 (or its agent) along with the network access information 22 associated with those images 21 (Step 400). The transmission of the images 21 to the service provider 10 can be made either physically 20' (e.g., via mail) or digitally 20, via the network 24, or by other suitable means.

Upon receipt of the images 21 and the network access information 22, the image hosting service provider 10 posts the images 21 on a server accessible over the network 24 at the predetermined, reserved location for viewing by anyone with the network access information 22 (Step 500). Thus, the intended recipients 18, who are in possession of the network access information 22 can access the images 11 by accessing the server of the image hosting service provider 10 (using the url of the network access information) and then entering the password.

The network access information 22 can be included on a photo-processing envelope which is provided to the user 12 prior to taking pictures. The envelope can include a return address and pre-paid postage such that when the user is finished with the film, the user can conveniently mail the film to the photo processor. The photo processor obtains the network access information 22 from the envelope and provides the processed images and the network access information 22 to the image hosting service provider 10 (which may be the same company) for posting.

Figure 3:
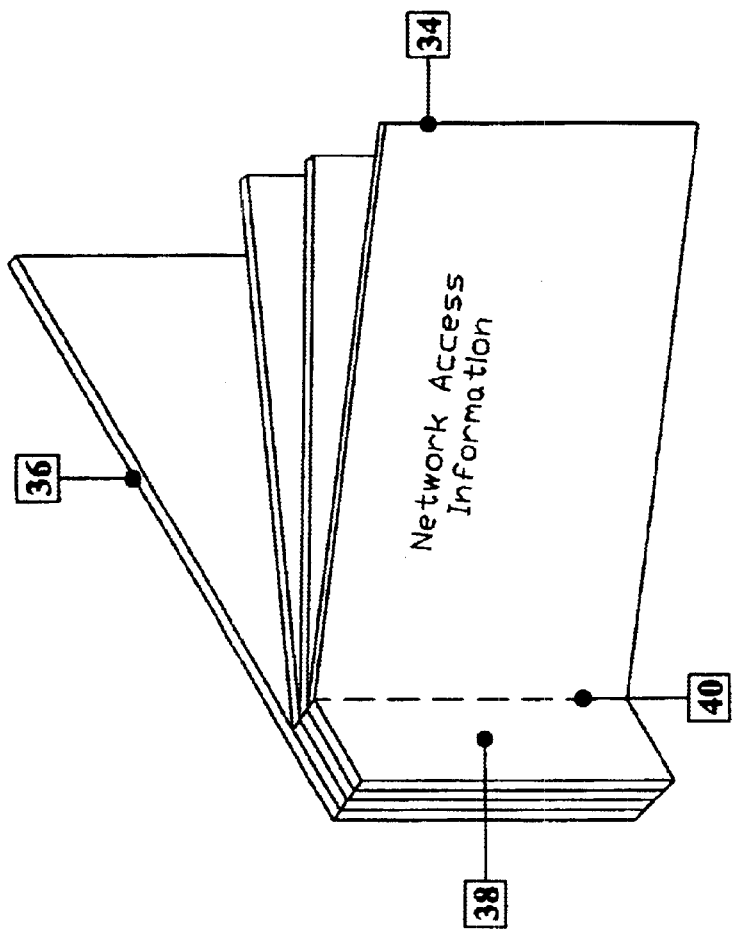
FIG. 3 is a perspective view of a network access information card booklet of the present invention.

Referring to FIG. 3, alternatively or additionally, the network access information 22 can be provided in the network access information cards 34 to be distributed by the photographer 12 at the time pictures are taken. One of such image access information cards (e.g., the first or last card) can contain the administrative password, which card would be held in confidence by the photographer. The network access information cards can be provided in the form of a tear-off booklet 36, where the individual cards are attached to a base portion 38 of the booklet 36 by a line of weakness 40, such as perforation.

Further, the card booklet 36 can be sized and shaped to fit within the boundaries of the back panel of a disposable camera, without inhibiting the functioning thereof. The card booklet 36 can include a pressure-sensitive adhesive on a back portion 42 for attachment to a camera, such as a one-time-use camera.

If the media upon which the images are recorded must be physically transmitted to the hosting service provider 10 for processing, such as 35 mm film, then, upon submission by the photographer 12, one of such cards 34 can be included inside the film processing envelope to associate the images 21 recorded thereon with the reserved network access information 22. The network access information cards 34 can be attached to, or "bundled" with the photographic image storage media at, or prior to, the point of purchase. Thus, the method allows a user 12 to provide intended recipients 18 of digital images 21 with the network location of the images 21 at or near the time the photographs are taken without having to pre-register with an image hosting service provider.

Figure 4:
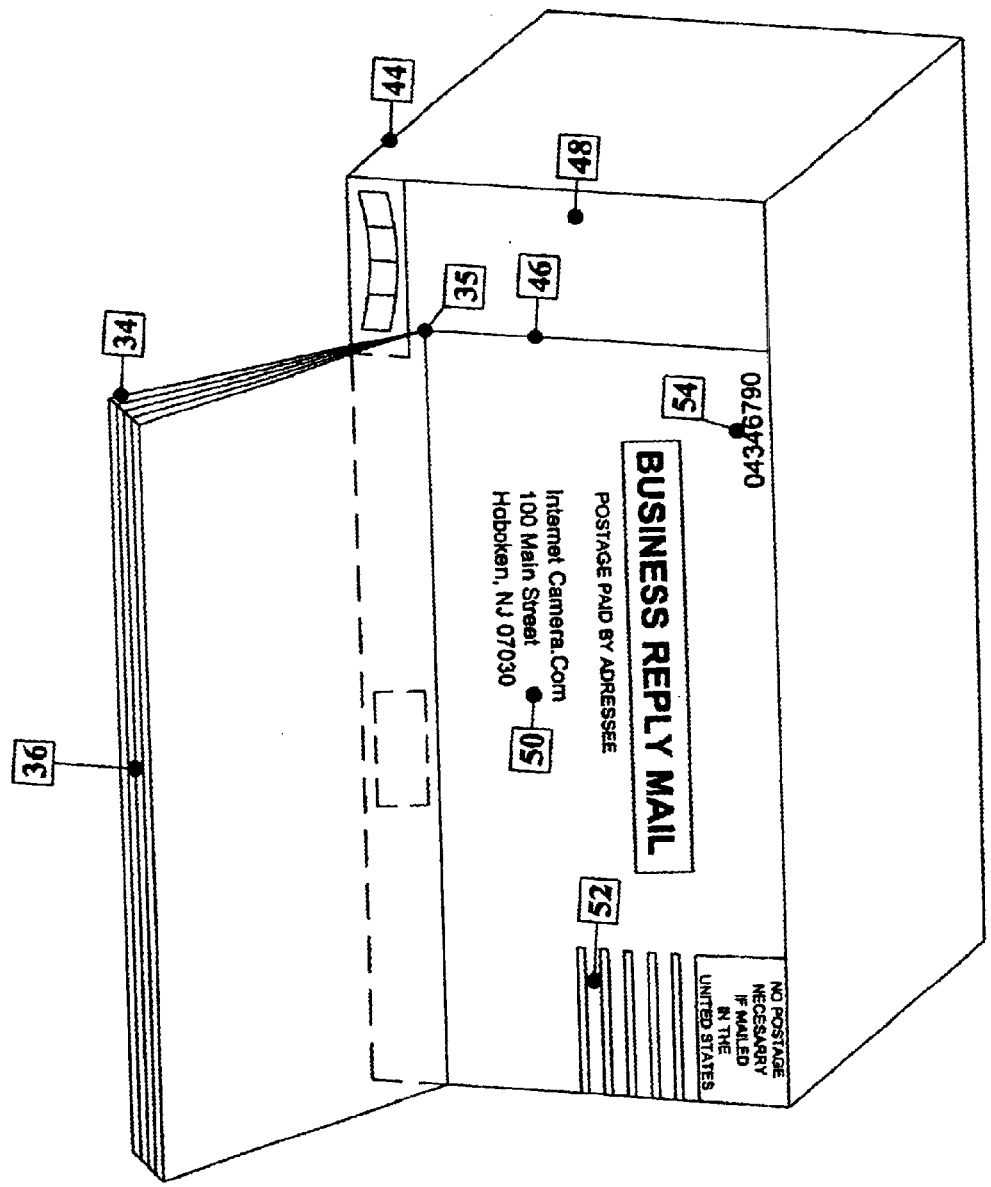
FIG. 4 is a perspective view of a network access information card booklet having a return mailing address and pre-paid postage affixed to a disposable camera.

Referring to FIG. 4, if the photographic image storage media is contained in or is provided along with a photographic device 44, such as a one-time-use camera, or the like, the image access information cards can be removably attached to the photographic device 44, such as with a tear-off spine 35 or in a pocket or pouch affixed to the photographic device 44. In this manner, the image access information cards 34 are readily and conveniently available to be distributed to the intended recipients of the photographic images. The network access information can also be permanently associated with the one-use camera, such as by printing or otherwise encoding the network access information on, for example, the outside of the camera. Alternatively (or additionally), the network access information can be provided on a label to be affixed to other types of photographic image storage media (e.g., 35 mm film), such as a self-adhesive sticker, which sticker is placed upon the media prior to submission to the photo processor.

The last or bottom card 46 of the booklet 36 can be substantially permanently attached to an outer cover 48 of the camera 44 and can include a mailing address label 50 and pre-paid postage 52, such as a postal permit. Thus, when a user is finished with the camera 44, the user need only drop the camera 44 into the nearest postal receptacle. Preferably, the camera 44 or booklet 36 includes the network access information thereon, or as shown, a reference code 54, which reference code is associated with the network access information assigned to the camera 44. Therefore, when the camera 44 is received by the photo processor/image hosting service provider 10, the network access information (or reference code thereto) is used to make the images available at the assigned network address.

Referring to FIGS. 5–8, the network access information cards 34 (and booklet 36) can be attached to the inside surface 56 of a wrapper or cover 58 for a camera 44, such as a one-time-use camera. The cover 58 includes front, back, top and bottom panels 72, 74, 76, 78 sized and configured to overly the respective front, back, top and bottom panels of the camera 44. The front, back and top panels panels 72, 74, 76 include apertures to permit the normal functioning of the camera. Specifically, the cover 58 includes apertures for the lens, flash, view-finder, shutter release, indicator lights, film advance mechanism, and other features of the camera 44. The bottom and/or top panels 76, 78 preferably include an adhesive to secure the cover 58 to the body of the camera 44.

Figure 5:
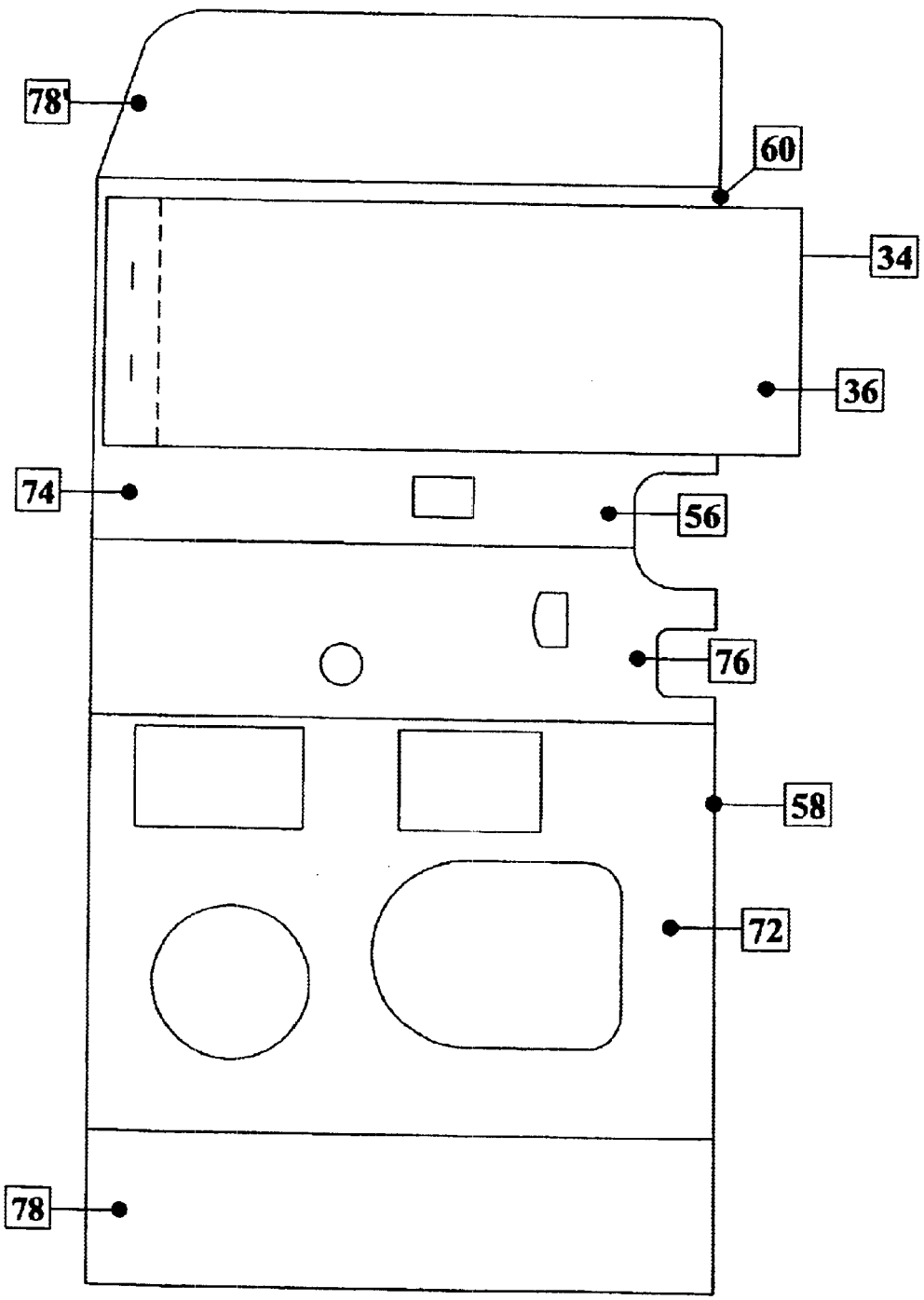
FIG. 5 is a layout of an interior of a network access information card booklet cover of the present invention.
Figure 6:
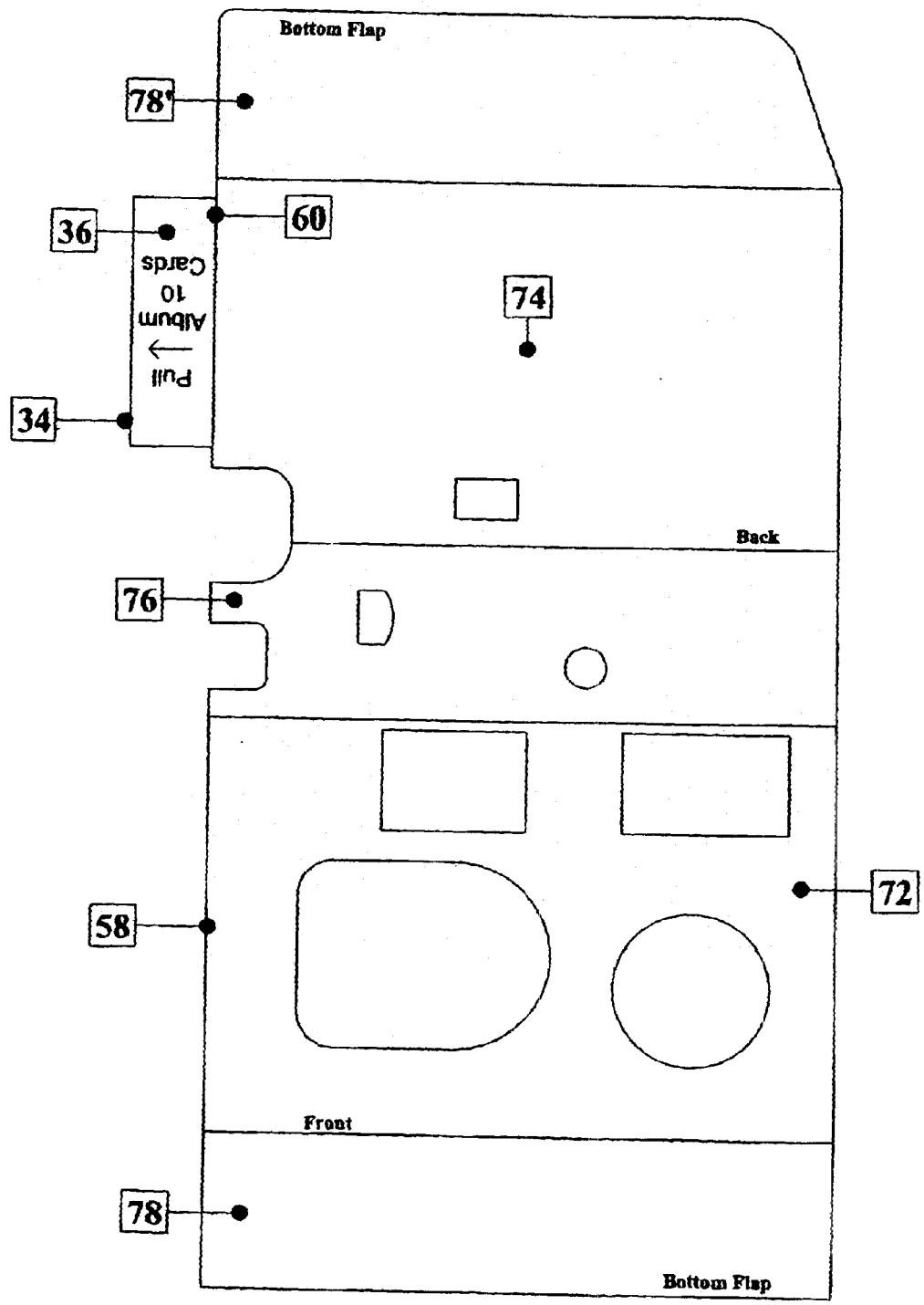
FIG. 6 is a layout of an exterior of a network access information card booklet disposed around a disposable camera.
Figure 7:
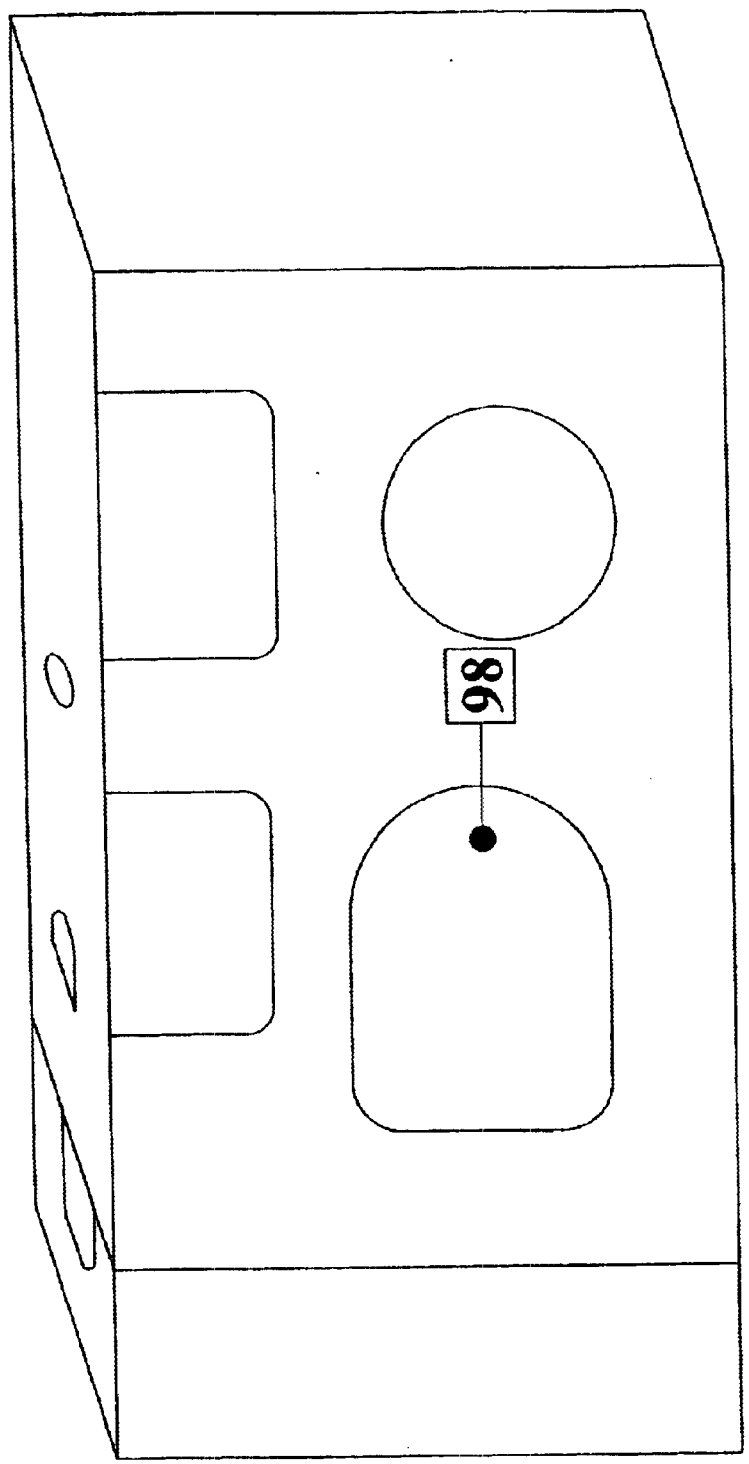
FIGS. 7 and 8 are perspective views of a network access information card booklet cover disposed around a disposable camera, from the front and rear, respectively.
Figure 8:
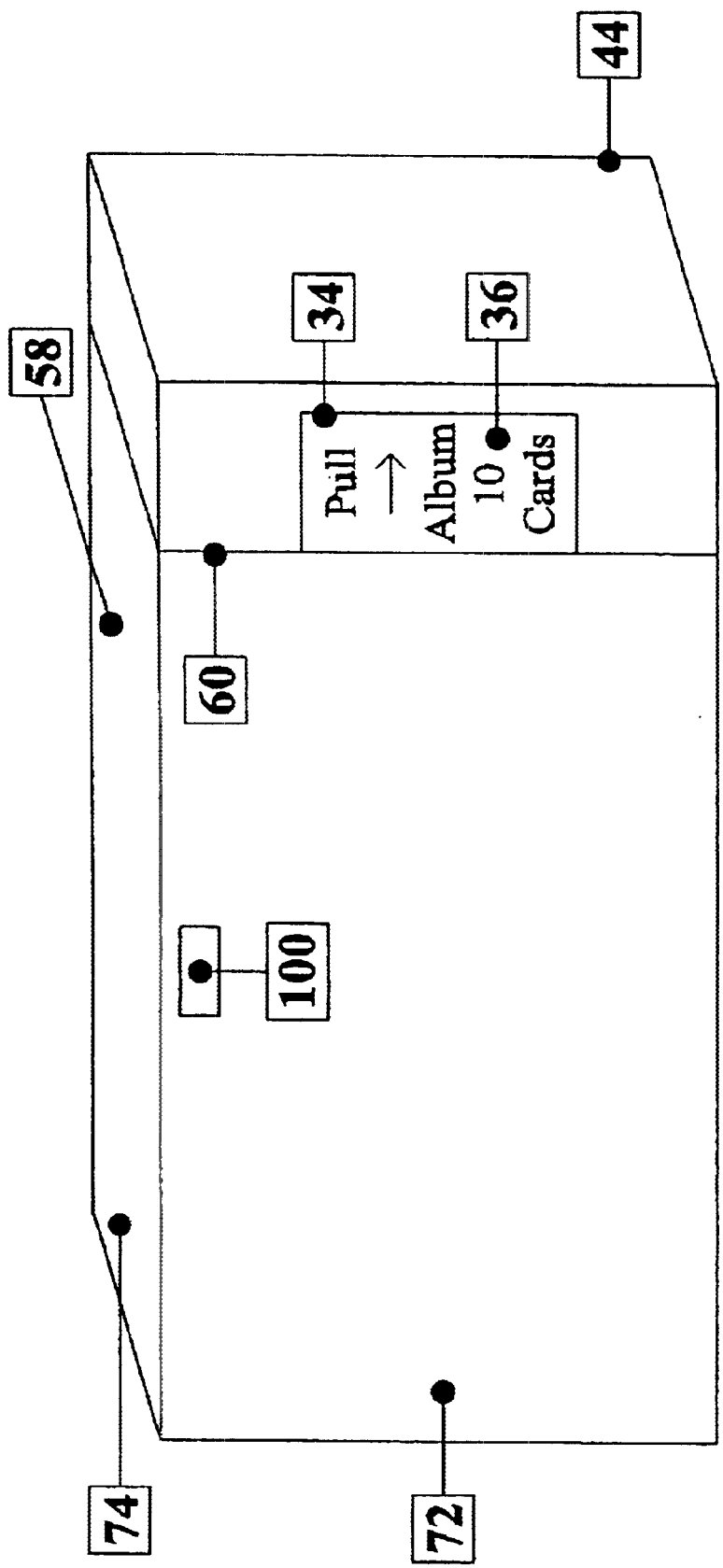

As shown in FIGS. 5, 6 and 8 a portion of each network access information card 34 preferably protrudes a distance from a side edge 60 of the cover sufficient to be grasped between a person's fingers. As shown in FIGS. 6 and 8, the cover 58 substantially covers the cards, and when the cover is encircled around the body of the camera 44, the network access information cards 34 and booklet 36 are protected by the cover 58. Yet, the cards can be removed by grasping the protruding portion and removing the grasped card from the booklet.

Figure 9:
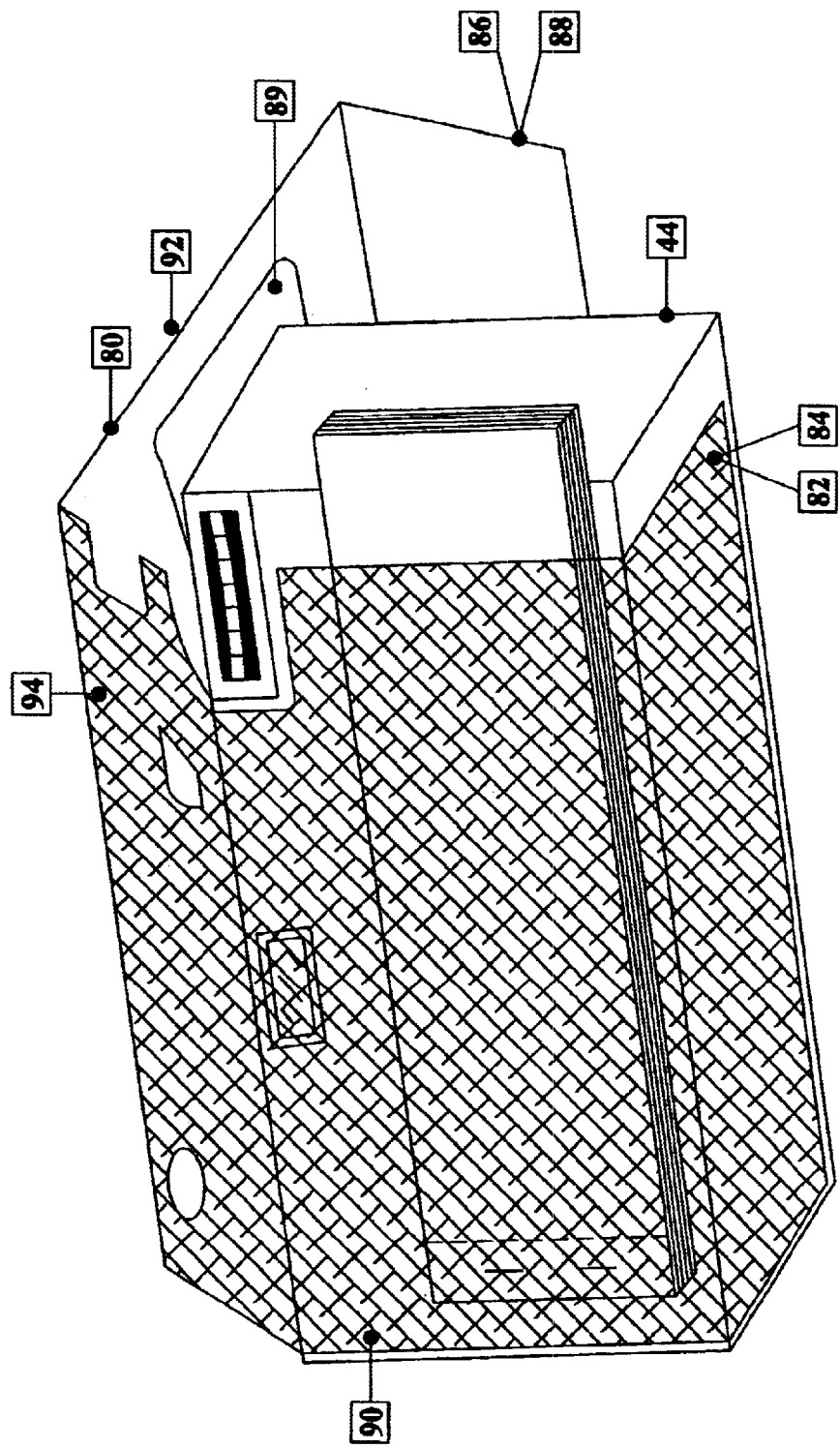
FIGS. 9 and 10 are perspective views of a removable cover partially disposed around a disposable camera.
Figure 10:
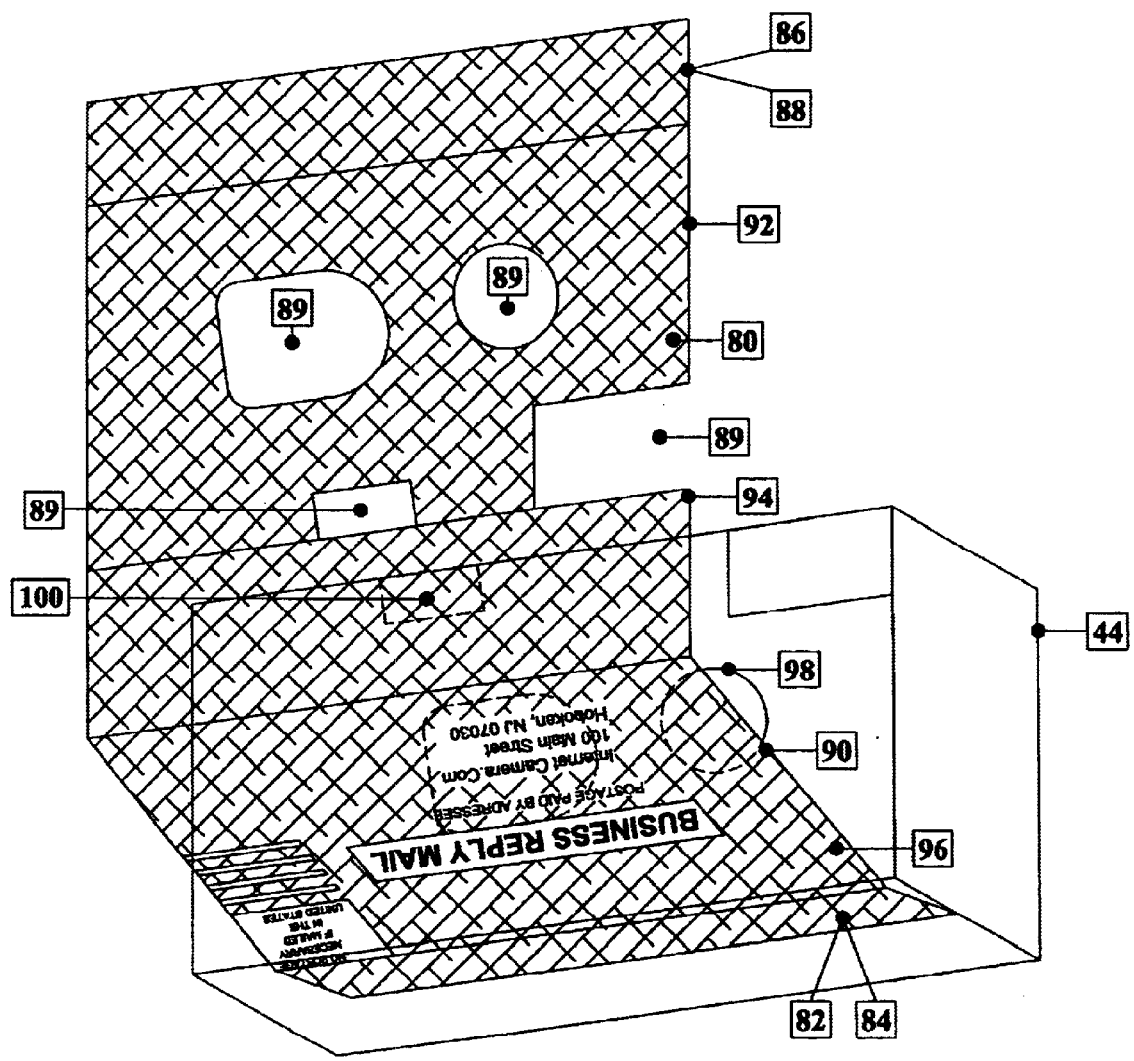
Figure 11:
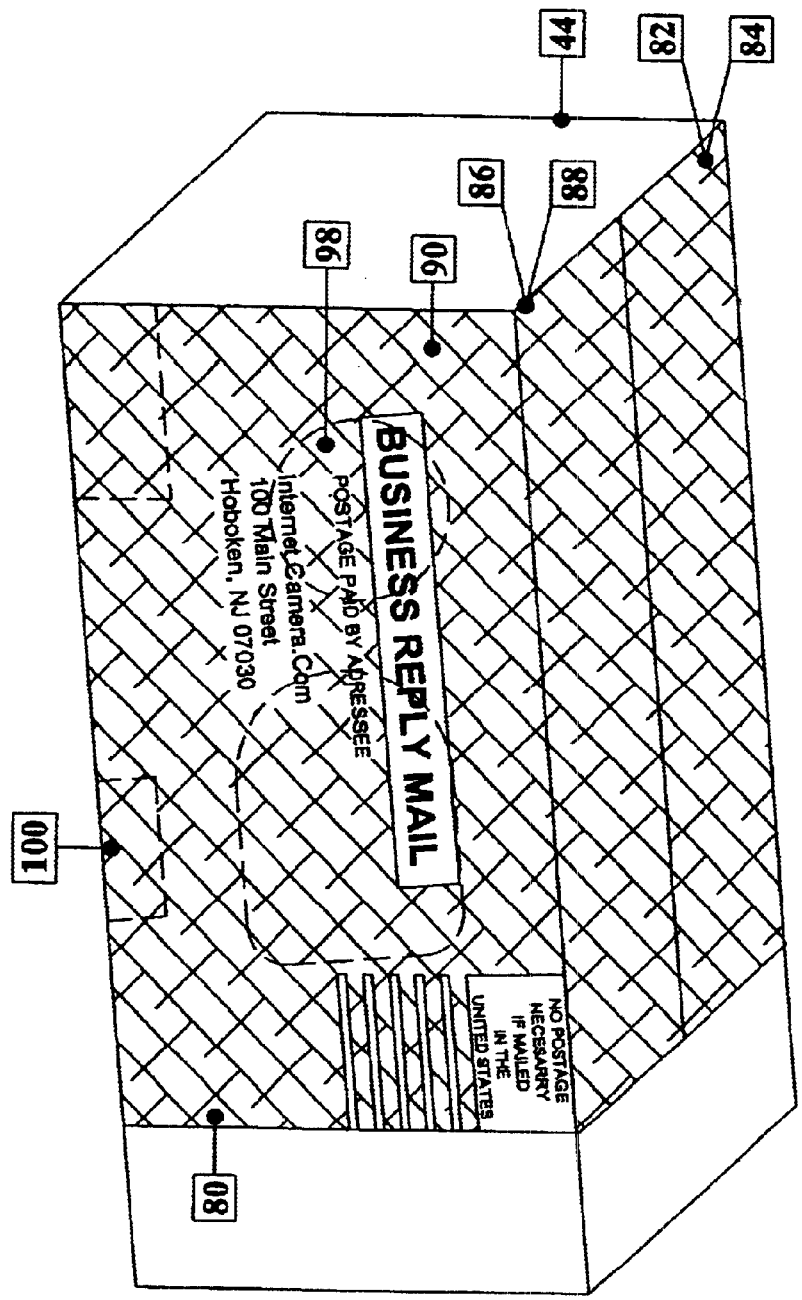
FIG. 11 is a perspective view of a removable cover in an inoperable position.

Referring to FIGS. 9–11, a camera 44 as used in accordance with the invention can include a reversible wrapper or cover 80, which can be used to protect and disable the camera during shipping. The cover 80 is substantially permanently attached to the body of the camera 44 by a first portion 82, for example a first bottom panel 84 and removably attached to the camera 44 by a second portion 86, for example a second bottom panel 88. The cover 80 also has back, front and top panels 90, 92 and 94. The cover 80 has a first, operable position wherein apertures 89 in a front panel 90 of the cover 80 align with the functional components of the camera 44 (i.e., lens 98, view-finder 100, etc.). The cover also has a second, inoperable position wherein at least the lens 98 of the camera 44 is covered by the back panel 90 of the cover (FIG. 11). Preferably, the camera 44 and/or cover 80 has pressure-sensitive adhesive, or another type of fixation means (e.g. on one or both of the bottom panels 84, 88) such that the second portion 86 can be attached to the camera 44 both in the operable position and in the reversed, inoperable position. Preferably the adhesive means which secures the cover 80 in the operable position is releasable and the adhesive means which secures the cover 80 in the inoperable position is substantially non-releasable such that the cover 80 would need to be partially or completely damaged to release the cover 80 from the inoperable position.

Also preferably a return address and pre-paid postage is pre-printed on the inside surface 96 of the back panel 90 such that when the cover 80 is reversed and fixed in the inoperable position, the return address and pre-paid postage is exposed and visible. Thus, when the user is finished with the camera 44, the cover 80 can be reversed and fixed into the inoperable position, which protects the lens and renders the camera inoperable. Then the camera 44 can be conveniently deposited into the nearest postal receptacle. As above, the camera can include the network access information printed thereon, or a code associated with the network access information, which information is used by the photo processor/image hosting service provider to post the photographic images on a server connected to the network.

Figure 12:
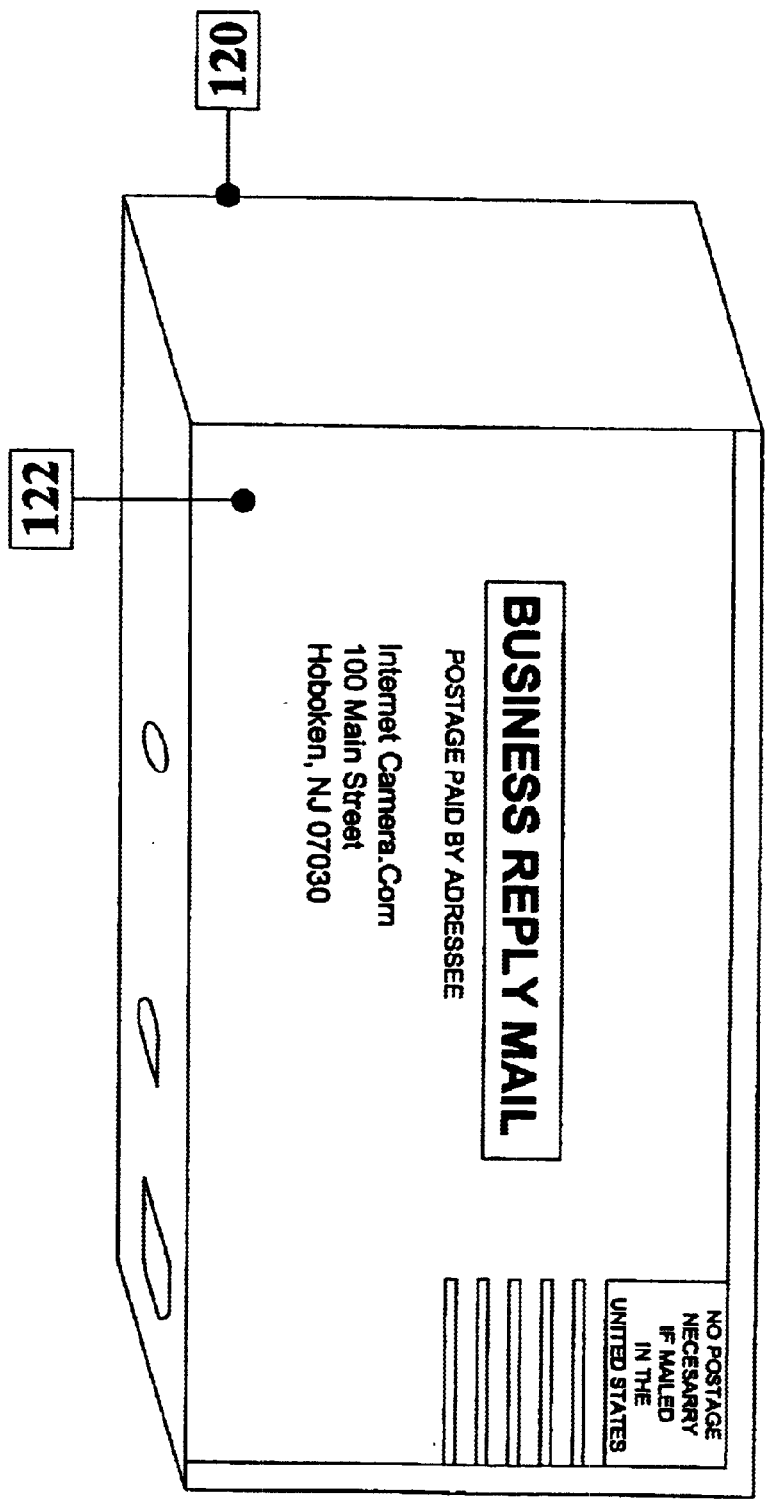
FIG. 12 is a perspective view of a protective and disabling mailing cover affixed over a front of a disposable camera.

Referring to FIG. 12, a disposable camera 120 can be provided with a protective and disabling mailing cover 122 which includes adhesive means, such as a pressure-sensitive adhesive on a back surface thereof for attachment to the camera 120 over the lens (front) thereof. The cover 122 can include a return address and pre-paid postage thereon. Thus the cover 122 can be used to disable the camera 120 and to address and send the camera to the photo processor and image hosting service provider.

Alternatively, the network access information 22 can also be permanently associated with a digital camera by the image hosting service provider 10 prior to purchase by a user 12. This can be accomplished by assigning, or reserving, a global network address (URL) to each camera, which address can be based on a unique identification number or serial number of the camera. An image number can also be incorporated into the network location. For example, photographs hosted by an image hosting service provider 10 at the domain <www.camerai.com>, which were taken with a camera having a serial number of 1200 could have the partial network location of <www.camerai.com/1200>. The image number can then be added to the base network location to complete the address. Thus, the first such image (image 0001) could have the address/file name <www.camerai.com/1200-0001.jpg>.

As above, an access password could be assigned to the image. This can be accomplished using, any suitable method. For example, the camera would have the capability of electronically calculating a password for the image number using an algorithm or formula, or the camera would generate a random password for the image number. The camera may also be programmed to allow the user to input a password for specific images and to record such input passwords.

The camera preferably has means for communicating network access information 22 to the user 12. The information can be displayed on an LCD panel, or printed from a printer that is attached to, or integral with the camera. As described above, the user 12 can also be provided with pre-printed cards containing the network access information 22, including the URL, the camera identification number and associated passwords, with the digital camera. Thus, as above, when the photographer 12 captures a photographic image 21 on the storage media, he (or she) can communicate the access information 22 associated with the storage media, or the individual photographic image, to the intended recipient 18 at the time the image is captured and recorded, or shortly thereafter.

To accomplish this alternative method of electronically transmitting the photographic images to the image hosting service provider, the photographer can employ a "client" program running on, for example, a personal computer connected to the network. The client program is programmed to read the photographic image data recorded on the storage media, and to read the network access information associated with the storage media, and is programmed to transmit such information to the image hosting service provider. One skilled in the art, would be able to develop such a client program with minimal effort.

Optionally, the network access information can be assigned to a group (i.e., a plurality) of photographic image storage media or photographic devices for allowing access to a large group of images.

Additionally, the network access can be employed to provide targeted marketing and advertising to recipients of the photographic images over the network. To facilitate this, the time and place of distribution (e.g., sale) of the network access information is recorded, preferably in a database, and is transmitted or is accessible to the photographic image hosting service provider. Thus, when images associated with certain network access information are viewed over the network, the photographic image hosting service provider can present advertising or marketing information along with, or contemporaneously with the photographic images.

The network location (network address) of a photographic image available over the network can be divided into three portions: an image batch identifier, an image group identifier, and an image identifier. The image batch identifier can identify, for example, all images associated with all network access information distributed in connection with a particular event or promotion. The image group identifier can identify, for example, all images recorded on a specific storage media or photographic device for associated group thereof) associated with a particular network access information. The image identifier can identify a specific image.

The unique network access information can be used to generate the administrative and user passwords for accessing such images. In this manner, the network access information is processed according to a confidential, predetermined administrative password generation algorithms and user password generation algorithms to generate the administrative and user passwords, respectively. If each individual photographic image recorded on a storage media associated with a network access information is assigned a unique user password, then an image number of the photographic image can also be used to generate a unique user password for each image.

For example, images recorded on a photographic image storage media or photographic device purchased at a store can be assigned the following network location and passwords:

| Batch group | Image group | Image # | Administrative password | User password |
|---|---|---|---|---|
| StoreName | 00001 | 01 | Ygwcmn67 | Uytr8279 |
| StoreName | 00001 | 02 | Ygwcmn67 | Luhy872w |
| StoreName | 00001 | 03 | Ygwcmn67 | Uyy58o77 |
| StoreName | 00001 | 04 | Ygwcmn67 | Tsytr8279 |
| StoreName | 00001 | 05 | Ygwcmn67 | Yut632tro |
| StoreName | 00001 | 06 | Ygwcmn67 | Luhygeu5 |
| StoreName | 00001 | 07 | Ygwcmn67 | Uytr8279 |
| StoreName | 00001 | 08 | Ygwcmn67 | Ushtegdm |
| StoreName | 00001 | 09 | Ygwcmn67 | Tsyehsyd |
| StoreName | 00001 | 10 | Ygwcmn67 | Uyyhsyer |
| StoreName | 00001 | 11 | Ygwcmn67 | Baty872w |
| StoreName | 00001 | 12 | Ygwcmn67 | UBavt7sh |

The network access information cards for the []administrator[] and the recipients of the first four images recorded on the above-described media or photographic device, and hosted by a service provider having the Internet domain name www.camerai.com could contain the following information:

Administrative key card
Internet address: www.camerai.com/StoreName0000100
Administrative password: Ygwcmn67

User key card 1
Internet address: www.camerai.com/StoreName0000101
Image password: Uytr8279
User key card 2
Internet address: www.camerai.com/StoreName0000102
Image password: Luhy872w User key card 3
Internet address: www.camerai.com/StoreName0000103
Image password: Uyy58o77
User key card 4
Internet address: www.camerai.com/storeName0000104
Image password: Tsytr8279

In an alternative embodiment of the method, each photographic image storage medium has a unique identification number, such as a serial number, or other unique identifier. The unique network access information is linked to the unique identifier of the storage media and a compilation of such associated network access information and storage media identifier information is maintained, for example in a database, and is accessible to a provider of photographic image hosting services, such as the manufacturer of the image storage media.

When the photographic image storage media is transmitted to the photographic image hosting service provider, the provider retrieves the unique network access information associated with the media using the unique media identifier, and stores the photographic images on a host computer connected to the global computer network, at a location accessible using the unique network access information.

The photographic image hosting service provider can determine the intended location for storing the photographic images by accessing the compilation database of such information described above and matching the unique identifier of the photographic image storage media with the associated network access information. Preferably, the unique identifier of the photographic storage media is readily discernible from the storage media itself by automated means, for example by bar code reader, or the like, by the hosting service.

Alternatively, instead of physically transmitting the photographic image storage media to the image hosting service provider, the photographer can digitally transmit the data recorded on the photographic image storage media representing the photographic images, along with the unique identifier of the photographic image storage media to the image hosting service provider. The image hosting service provider can then match the photographic images with the intended network location, as described above, and post the images on the network at the intended location, for access by the intended recipients.

As above, to accomplish this alternative method of transmitting the photographic images to the image hosting service provider, the photographer can employ a "client" program running on, for example, a personal computer connected to the network. The client program is programmed to read the photographic image data recorded on the storage media, and to read the unique identifier of the storage media, and is programmed to transmit such information to the image hosting service provider. One skilled in the art, would be able to develop such a client program with minimal effort.

Optionally, unique network access information can be assigned to a plurality of photographic image storage media or photographic devices for allowing access to a large group of photographic images. The plurality of image storage media or photographic devices can each be assigned a unique media identifier, as described above, or could share a common media identifier, which common media identifier is unique to the group. In this manner, a photographer taking a large number of pictures can easily provide access to entire group of pictures.

Additionally, the media identifier associated with the photographic image storage media or photographic device can be employed to provide targeted marketing and advertising to recipients of the photographic images over the network. To facilitate this, the time and place of sale of each photographic image storage media or photographic device is recorded, preferably in a database, and is transmitted or is accessible to the photographic image hosting service provider. Thus, when images recorded on specific image storage media are viewed over the network, the photographic image hosting service provider can present advertising or marketing information along with, or contemporaneously with the photographic images.

The unique photographic storage media identifier can include a set of alpha-numeric characters and can be used to generate both the network address at which photographic images will be located, and the administrative and user passwords for accessing such images. In this manner, the media identifier is processed according to a confidential, predetermined network address generation algorithm to generate the network address. And, the media identifier is processed according to confidential, predetermined administrative password and user password generation algorithms to generate the administrative and user passwords, respectively. If each individual photographic image recorded on a storage media is assigned a unique user password, then an image number of the photographic image can also be used (along with the unique media identifier) to generate a unique user password for each image recorded on the storage media.

If network address and passwords are generated according to predetermined algorithms, then, the need to maintain the compilation database of media identification codes, network locations, and passwords described above can be eliminated. If such predetermined algorithms are used, the network locations and passwords can be generated by the image hosting service provider on an "as-needed" basis. Thus, the image hosting service provider need only receive the media identifier to generate the intended network location, and administrative and user passwords, using the predetermined algorithms.

This method of providing access to photographic images over a computer network can also be used in automated, "do it yourself" photo imaging devices. For example a camera can be provided to take pictures of the riders of an amusement park ride. Each photo taken is assigned a unique identifier and the riders are provided with the global computer network address at which the image will be stored (and any corresponding password). In addition, a kiosk can be provided with a digital camera, means for communicating network access information to interested parties, and means for transmitting the image information to a photographic hosting service. The kiosk would assign a network location to each image, and would communicate the network address of the image, and any corresponding password to the user. This can be accomplished via a "hard copy" printout of the information, or other forms of communication. The digital image and its associated identifier are then sent to the image hosting service provider, to be accessed on the Internet by the user. These types of systems allow users to have the information needed to view the image on the Internet at the time the image is taken, without having to register with the image hosting service.

The present invention streamlines the process of making photographic images available to intended viewers or recipients over a global computer network, such as the Internet. The method eliminates the prior need to wait until after photographic images are posted on (i.e., accessible over the) Internet and the prior need to establish an account with an image hosting service to communicate the network access information of the images, such as the network address and password, to the intended recipients of the images.

What is claimed:

1. A method of providing access to photographic images over a computer network, comprising:

predetermining network access information for a set of photographic images by a service provider, said network access information including a network address;

conveying said pre-determined network access information to a user without associating said network access information to said user;

said user capturing a set of photographic images after receiving said network access information;

said user conveying said network access information to an intended viewer of said photographic images;

said service provider receiving said photographic images and receiving information associating said photographic images with said pre-determined network access information; and said service provider posting said photographic images on a server connected to said network, said photographic images being accessible over said network at said network address of said network access information.

2. The method of claim 1, wherein:

said step of conveying said network access information to said user comprises providing a plurality of network access information cards to said user, said network access information cards including said network access information;

wherein said step of conveying said network access information to said intended viewer comprises distributing one of said network access information cards to said viewer.

3. The method of claim 2, wherein said network access information cards are bound together in a booklet, which booklet is sized and shaped to fit on a back panel of a disposable camera without inhibiting the functioning thereof, said booklet being mounted to said back panel of said camera.

4. The method of claim 3, wherein said booklet includes adhesive means on a back portion thereof for mounting said booklet to said back panel of said camera.

5. The method of claim 3, wherein:

said a back portion of said booklet includes a mailing address of said service provider or an agent thereof, and pre-paid postage; and said camera includes information associated with said network access information to allow said service provider or agent to associate photographic images recorded by said camera with said network access information.

6. The method of claim 3, wherein:

said camera includes a booklet cover disposed around a body of said camera;

said booklet being attached to an interior surface of said booklet cover;

a portion of said booklet extending outwardly from said booklet cover a distance sufficient to grasp a card of said booklet between a person's fingers to allow the removal of one of said cards from said booklet.

7. The method of claim 6, wherein said body of said camera includes a body cover and wherein said booklet cover is disposed around said body cover.

8. The method of claim 1, further comprising:

a disposable camera having a body and a reversible cover affixed to said body;

said reversible cover having an operable position in which function features of said camera are operable, and having an inoperable position in which a lens of said camera is covered by said cover;

said cover including means to fix said cover alternatively in said operable and inoperable positions;

said cover including a back panel having an interior surface, said interior surface including a pre-printed mailing address and pre-paid postage imprinted thereon;

said mailing address and pre-paid postage being concealed when said cover is in said operable position and being exposed when said cover is in said inoperable position.

9. The method of claim 8, wherein said cover has a first end portion substantially permanently affixed to said camera body and an opposing end portion releasably affixable to said camera body.

10. The method of claim 9, wherein said camera includes means to releasably affix said opposing end portion in said operable position and means to substantially permanently affix said opposing end portion in said inoperable position.

11. The method of claim 1, wherein:

said network access information is associated with a unique photographic media identifier of a photographic media, said unique media identifier being contained on said photographic media;

said user receives said photographic media and returns said photographic media to said service provider or an agent thereof; and said service provider identifies said network information of said photographic images using said unique media identifier.

12. The method of claim 1, wherein said step of conveying said network access information to said user comprises providing a network access information card to said user, said network access information cards including said network access information; and further comprising said user delivering said photographic images to said service provider or an agent thereof with said network access information card.

* * * * *